Figure 1:
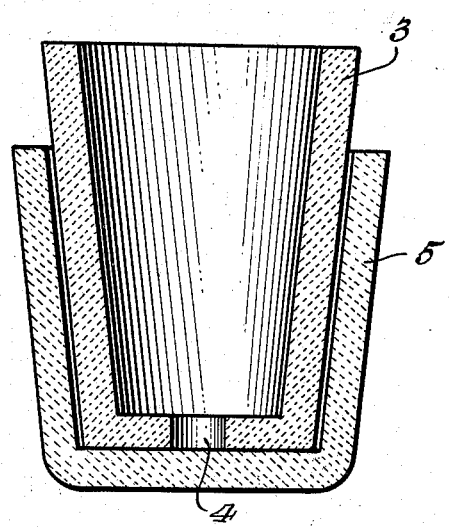

Feb. 4, 1958     H. M. FEDER ET AL     2,822,260
DECONTAMINATION OF URANIUM
Filed Feb. 21, 1956

INVENTORS
Harold M. Feder
Norman R. Chellew
by Roland A. Anderson
Attorney

United States Patent Office 2,822,260
Patented Feb. 4, 1958

2,822,260
DECONTAMINATION OF URANIUM

Harold M. Feder, Park Forest, and Norman R. Chellew, Joliet, Ill., assignors to the United States of America as represented by the United States Atomic Energy Commission Application February 21, 1956, Serial No. 574,051

9 Claims. (Cl. 75—84.1)

This invention deals with the separation of rare earth and other fission product metal values from neutron-bombarded uranium and also with the separation of rare earth metal values from uranium broadly.

In the processing of neutron-bombarded uranium it is desirable to recover the uranium for re-use without dissolving it or otherwise diluting the metal. For many uses it is furthermore advantageous to obtain a plutonium-enriched uranium-base fuel material; this is true, for instance, if the uranium is to be used as fuel for a power breeder reactor.

It is an object of this invention to provide a process for the removal of fission products from neutron-bombarded uranium in which the uranium is not diluted.

It is another object of this invention to provide a process for the removal of fission products from neutron-bombarded uranium in which the uranium remains in its metallic state.

It is also an object of this invention to provide a process for the removal of fission products from neutron-bombarded uranium in which the fission products are removed in a comparatively concentrated form which facilitates their disposal.

It is still another object of this invention to provide a process for the removal of fission products from neutron-bombarded uranium in which the fission products are extracted to a high degree but the plutonium is retained in the uranium.

These objects are accomplished by melting the uranium in contact with at least one oxide selected from the group consisting of thorium oxide, magnesium oxide, aluminum oxide, beryllium oxide, and uranium dioxide. The melting is preferably carried out at from 1150° to 1400° C. in an inert atmosphere, such as argon or helium. The heating time depends on the temperature and the size of the batch; a period of 4 hours was found satisfactory in a great many instances. During this treatment a scale of uranium dioxide forms on the uranium, as was ascertained by X-ray diffraction, which is strongly concentrated in regard to most of the fission products.

From the thermodynamic point of view the oxidation of appreciable amounts of uranium by the oxides with which the uranium is contacted in accordance with this invention was quite unexpected, as is obvious from Table I which gives free energy values of formation of some of the oxides in kilocalories per gram-atom of oxygen ($-\Delta F_f°$). These energy values, of course, must be modified to consider surface energy values and also to take in account abnormalities occurring in solutions of various oxides.

TABLE I

| Oxide | $-\Delta F_f°$ at 1,227° C. |
|---|---|
| $ThO_2$ | 115.0 |
| $MgO$ | 103 |
| $Al_2O_3$ | 102 |
| $UO_2$ | 99 |
| $BeO$ | 111.6 |

These values show that the uranium dioxide is the least stable of the oxides listed.

The oxides are advantageously used in the form of a crucible consisting of, or lined with, these oxides. The temperature is preferably held between 1150° and 1250° C. At this temperature the oxide dross or slag which contains the fission prodducts remains solid, and the molten uranium can be separated therefrom directly.

The crucibles can be made by dry-pressing, slip-casting, or any other method known to those skilled in the art. In the case of using uranium dioxide as the crucible material it is advantageous to fire the formed crucible in an atmosphere of purified hydrogen at approximately 1750° C.

In order to carry out the process of this invention the irradiated fuel elements or slugs are first decanned and then surface-treated by methods known to those skilled in the art for the removal of any bonding material. For each experiment reported in this specification two disks were cut at symmetric locations from a slug thus treated. One of the two disks was analyzed without treatment as a control sample; the other disk was treated by the process of this invention.

That disk was prepared for the melting operation according to this invention by pickling it with nitric acid and then drying. The crucible made of one of the oxides listed above was degassed at a temperature of at least 1000° C. and then permitted to cool in vacuum or an inert atmosphere, such as helium. The disk was then placed into the crucible and both together were then degassed in an electrical furnace at 600° C. to a pressure of about $10^{-4}$ mm. of mercury.

Helium of about 1.1 atm. abs. was introduced to the system and then continuously passed therethrough at 100 to 150 cc./min.; at the same time the temperature was increased to about 1200° C. and maintained for a predetermined time. Instead of sparging with helium a stationary helium atmosphere was also found satisfactory.

After the metal had been held at the temperature for the time desired, the electrical power was shut off and the charge was allowed to cool in the helium atmosphere. The melts were not removed until the temperature had reached 150° C. or below. It took about 24 hours until the content of the crucible had cooled down to approximately 100° C.

In the embodiment using an oxide crucible of conventional construction the uranium obtained was covered with a skin of oxide. This skin was dissolved separately from the interior or ingot of uranium by chemical means for the purpose of analysis as will be described below.

In some runs an oxide crucible was used that had a hole in the bottom; a stopper fitted into the hole and was operated by a rod attached to the stopper. As soon as the melting operation was completed, the stopper was raised so that the molten metal was cast through the bottom into a tantalum crucible, for instance, arranged underneath. An average of about 2% of the entire mass was retained in the oxide crucible as a skull. This skull, like the oxide skin described above, was enriched in fission products, as will be shown later.

Figure 2:
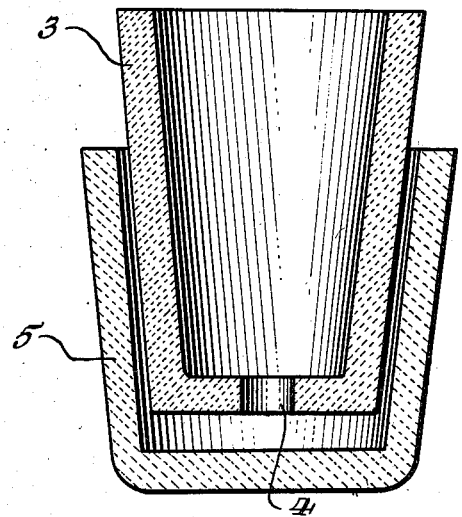

Another arrangement which was used successfully is diagrammatically illustrated in the accompanying drawings, Figure 1 being a sectional view of the device in melting position and Figure 2 a similar view in metal-slag-separating position.

The arrangement comprised two concentrically arranged crucibles, an inner oxide crucible 3 with a bottom hole 4 and an outer aluminum oxide crucible 5 which are lapped together for a smooth fit. The uranium was melted in the inner crucible 3 while it was supported by the outer crucible 5. When the liquation was finished, the inner oxide crucible 3 was slightly lifted, as shown in Figure 2, so that the molten metal could run out of the inner crucible 3 through the hole 4 into the outer crucible 5; the skull was retained in the inner crucible 3. This arrangement is particularly advantageous in the case that operation by remote control is necessary.

The process can be carried out in any type of equipment known to those skilled in the art; for instance, the oxide crucible with the uranium was placed into a porcelain tube which was then inserted into an electrical resistance furnace. The whole assembly was installed in a ventilated hood and the furnace was surrounded by steel shielding. The crucibles in the porcelain tube were in the center of the furnace-heating zone. The melt temperatures of 1200° C. were attained in approximately one hour with an input of two to three kw. Means for evacuation and for blanketing with argon or helium gas were connected with the system.

For analyzing the melted or treated disk and the untreated control disk, they were dissolved separately in nitric acid or a hydrochloric acid-nitric acid mixture, and each solution was analyzed. The skin or skull sections, as the case may be, which contained the oxide slag and the uranium metal ingot were also dissolved separately in each instance. In some cases the skin sections on the top of the ingot or on the bottom and on the sides were dissolved separately; this was accomplished by painting the surface to be protected with a benzene solution of wax. Skinning of the nonprotected area was then carried out with nitric acid, preferably of a concentration between 4 N and 8 N at temperatures not higher than 20° C. below the melting point of the wax. Where all sides of the skin were dissolved together, the ingot was immersed in the acid until a clean metal surface free from dark oxide was obtained. After this skinning step the remaining metal was dissolved in boiling nitric acid of a concentration of about 13 N under reflux. The final concentrations of both skin and interior solutions were usually between about 6 N and 8 N.

When "bottom-pour" methods were used no skinning, of course, was carried out. In these instances, the retained slag or skull and the cast ingot in the tantalum crucibles were dissolved separately.

The rare earths, cerium, strontium, ruthenium, cesium, and tellurium were counted as beta activities. Zirconium and niobium gammas were counted through a lead absorber using a scintillation counter which was adjusted to discriminate against photons of less than 0.1 m. e. v. energy. Molybdenum was determined colorimetrically, and uranium was determined either by weighing directly as metal or by the acetone-thiocyanate colorimetric method. Plutonium was followed by means of the standard lanthanum fluoride carrier technique and counting in an alpha proportional counter.

In order to increase the precision of the radiochemical analyses of the controls, the fission product activities of the untreated metal were plotted versus the decay ("cooling") times on semilogarithmic paper. Smooth curves were drawn through the points of these plots, and the curves were used as a basis of comparison. The slopes of the curves coincide with the known half-lives. The radiochemical analyses of the treated materials could then be compared with interpolated values for the controls in order to eliminate the variation due to decay time between analyses. Separate cerium analyses were not always made because the total rare earths activity was found to parallel the cerium[144] in behavior.

In the following some examples are given. In these experiments, the uranium was melted in crucibles made of the various oxides. The skin and ingots were dissolved separately as described above, and the solutions were analyzed. The contents of the various solutions in uranium, plutonium and various typical fission products are given in each example in percent by weight of their amount in the starting material. It will be noted that in many instances these percentage values do not add up to 100; apart from minor errors due to analytical methods, etc., most of the discrepancies were found to be caused by volatilization and/or diffusion of these fission products into the crucible.

*Example I*

A disk of neutron-irradiated uranium weighing 70.5 g., after "cooling" for 265 days, was found to contain 7 g. of plutonium per ton. This disk was melted in a funnel-shaped urania crucible at 1200° C. for 4 hours. After cooling of the melt the ingot obtained was cut vertically into 3 sections, and each section was skinned individually with dilute nitric acid. The various contents of the interior and of the skin of each section are shown in Table II.

TABLE II

| Section | Uranium | Plutonium | Rare Earths | Ce | Sr | Ru | Cs | Te | Nb | Zr | Total β | Total γ |
|---|---|---|---|---|---|---|---|---|---|---|---|---|
| | Percent | Percent | Percent | Percent | Percent | Percent | Percent | Percent | Percent | Percent | Percent | Percent |
| Top section, skin | 4.1 | 6.0 | 69.9 | 59.5 | 86.3 | 3.0 | 41.8 | 83.5 | 12.5 | 67.1 | 63.8 | 28.0 |
| Top section, interior | 55.0 | 49.6 | 0.5 | 0.2 | 0.9 | 38.2 | 1.7 | 5.4 | 49.5 | 21.0 | 6.4 | 43.4 |
| Middle section, skin | 0.8 | 1.7 | 11.0 | 10.7 | 4.2 | 0.4 | 3.6 | 5.4 | 1.6 | 5.4 | 8.5 | 2.7 |
| Middle section, interior | 21.9 | 20.2 | 0.1 | 0.05 | 0.1 | 20.9 | 0.6 | 1.5 | 21.3 | 8.6 | 4.0 | 16.9 |
| Bottom section, skin | 2.1 | 2.4 | 4.2 | 4.7 | 0.3 | 1.6 | 0.3 | 1.0 | 1.8 | 1.2 | 3.3 | 1.8 |
| Bottom section, interior | 15.7 | 14.3 | 0.4 | 0.05 | 0.05 | 15.5 | 0.4 | 1.0 | 14.7 | 8.1 | 1.7 | 12.2 |

It will be seen from this table that plutonium and ruthenium are retained practically quantitatively in the uranium and that niobium, while it was extracted to some degree, its bulk remained in the uranium. All other fission product values analyzed for were predominantly extracted into the skin.

*Example II*

78.4 g. of irradiated uranium which contained 7 g. of plutonium per ton and had been cooled for 298 days was melted as described above in a thoria crucible. The ingot obtained was skinned three times in succession with nitric acid and each of the three solutions was analyzed. The interior was also dissolved and analyzed. The results are given in Table III.

TABLE III

| Section | Uranium | Plutonium | Rare Earths | Ce | Sr | Ru | Cs | Te | Nb | Zr | Total β | Total γ |
|---|---|---|---|---|---|---|---|---|---|---|---|---|
| | Percent | Percent | Percent | Percent | Percent | Percent | Percent | Percent | Percent | Percent | Percent | Percent |
| Outer skin | 0.7 | 2.1 | 43.8 | 45.7 | 61.4 | 0.5 | 21.3 | 25.5 | 4.8 | 38.6 | 40.5 | 13.6 |
| Middle skin | 0.7 | 1.2 | 26.7 | 25.1 | 26.0 | 0.6 | 14.7 | 19.7 | 2.7 | 17.4 | 22.0 | 6.5 |
| Inner skin | 2.9 | 2.4 | 16.7 | 16.5 | 7.2 | 2.8 | 6.7 | 6.0 | 2.7 | 10.2 | 12.9 | 4.7 |
| Interior | 95.5 | 87.3 | 1.1 | 1.3 | 0.1 | 91.1 | 3.4 | 19.4 | 74.9 | 27.4 | 9.5 | 47.4 |

This experiment shows that the bulk of the fission products removed from the metal is taken up by the uranium oxide formed.

Example III 51.8 g. of uranium containing 7 g. of plutonium per ton and cooled for 306 days was melted in a magnesia crucible for four hours at 1200° C., and the ingot obtained after cooling was skinned three times in succession with nitric acid. The contents of the various fractions are given in Table IV.

TABLE IV

| Section | Uranium | Plutonium | Rare Earths | Ce | Sr | Ru | Cs | Te | Nb | Zr | Total $\beta$ | Total $\gamma$ |
|---|---|---|---|---|---|---|---|---|---|---|---|---|
| | Percent | Percent | Percent | Percent | Percent | Percent | Percent | Percent | Percent | Percent | Percent | Percent |
| Outer skin | 1.2 | 3.7 | 44.7 | 46.6 | 74.9 | 0.4 | 24.6 | 47.0 | 5.9 | 41.8 | 44.1 | 19.4 |
| Middle skin | 1.1 | 1.8 | 23.3 | 26.1 | 17.6 | 0.6 | 11.9 | 10.0 | 2.7 | 15.5 | 20.5 | 7.7 |
| Inner skin | 1.9 | 1.7 | 11.9 | 12.6 | 6.4 | 1.6 | 5.6 | 3.6 | 2.7 | 8.9 | 10.3 | 4.9 |
| Interior | 95.5 | 88.0 | 1.7 | 1.9 | 1.6 | 85.1 | 2.7 | 39.8 | 74.3 | 24.7 | 9.9 | 64.8 |

Example IV 45.2 g. of uranium containing 7 g. of plutonium per ton and cooled for 321 days was melted in an alumina crucible under the same conditions as were prevailing in Example III; the ingot obtained was skinned three times. The analytical results are compiled in Table V.

TABLE V

| Section | Uranium | Plutonium | Rare Earths | Sr | Ru | Cs | Te | Nb | Zr | Total $\beta$ | Total $\gamma$ |
|---|---|---|---|---|---|---|---|---|---|---|---|
| | Percent | Percent | Percent | Percent | Percent | Percent | Percent | Percent | Percent | Percent | Percent |
| Outer skin | 1.5 | 1.6 | 35.0 | 92.6 | 13.9 | 44.3 | 85.0 | 23.6 | 57.2 | 41.8 | 31.6 |
| Middle skin | 1.6 | 1.5 | 10.8 | 0.8 | 15.0 | 0.7 | 0.9 | 1.7 | 1.4 | 2.5 | 1.4 |
| Inner skin | 3.1 | 2.8 | 0.0 | 0.0 | 3.1 | 0.0 | 0.2 | 2.3 | 0.4 | 0.2 | 1.8 |
| Interior | 93.8 | 83.4 | 1.8 | 0.3 | 86.3 | 1.3 | 7.3 | 69.9 | 12.2 | 9.1 | 54.3 |

The extraction of the fission products into the skin was substantial.

While all these previous examples were carried out by melting for four hours at 1200° C., some tests were run using a 30-minute period only for the melting. This was true for Example V, which is comparable with Example I, both using urania crucibles and temperatures of 1200° C.

Example V

A disk of uranium which contained 7 g. of plutonium per ton, weighed 30.6 g. and had been cooled for 314 days, was melted in a urania crucible, and the ingot was skinned once. The concentrations in the skin solution and the solution obtained from the interior metal are compiled in Table VI. It will be seen that the period of 30 minutes did not bring about as good an extraction of the fission products as was obtained when the temperature of 1200° C. was upheld for four hours.

Example VI 91.4 g. of neutron-bombarded uranium cooled for 330 days and containing 7 g. of plutonium per ton was melted in a magnesia crucible at 1200° C. for 30 minutes, and the metal was then allowed to cool. The ingot was skinned 3 times in succession as described before. The distribution of the fission products in the various solutions is given below in Table VII.

TABLE VII

| Section | Uranium | Plutonium | Rare Earths | Sr | Ru | Cs | Te | Nb | Zr | Total $\beta$ | Total $\gamma$ |
|---|---|---|---|---|---|---|---|---|---|---|---|
| | Percent | Percent | Percent | Percent | Percent | Percent | Percent | Percent | Percent | Percent | Percent |
| Outer skin | 0.9 | 1.1 | 46.7 | 31.1 | 0.6 | 24.2 | 28.3 | 14.0 | 29.2 | 45.4 | 15.2 |
| Middle skin | 1.0 | 0.9 | 8.0 | 27.2 | 0.9 | 19.0 | 24.3 | 6.1 | 9.8 | 10.5 | 6.8 |
| Inner skin | 3.2 | 2.8 | 3.9 | 27.2 | 3.2 | 15.0 | 21.6 | 5.7 | 14.0 | 6.0 | 5.4 |
| Interior | 95.2 | 82.8 | 20.2 | 16.8 | 94.1 | 18.8 | 17.3 | 74.8 | 42.5 | 25.1 | 47.1 |

Here again it is obvious that extraction for 30 minutes is less complete than extraction carried out for 4 hours (Example III); this is particularly true in regard to strontium, tellurium and zirconium.

Several runs were carried out in which the temperature of 1200° C. was maintained for 11 hours; this additional heating time did not significantly improve the extraction obtained after 4 hours.

The following example illustrates the separation of the oxide layer from the uranium metal by mechanical means, namely, by draining the molten metal from an opening in the bottom of the crucible.

Example VII

A thoria crucible was used which had an opening in the bottom; the opening could be closed by a stopper. 263.3 g. of neutron-bombarded uranium which contained 42 g. of plutonium per ton and had been cooled for a period of 298 days were melted for 4 hours at 1200° C. After melting the stopper was lifted and the metal cast from the bottom of the crucible into a tantalum container; a skull was retained in the thoria crucible. The analyses of skull and ingot cast in the tantalum container are given in Table VIII.

TABLE VI

| Section | Uranium | Plutonium | Rare Earths | Ce | Sr | Ru | Cs | Te | Nb | Zr | Total $\beta$ | Total $\gamma$ |
|---|---|---|---|---|---|---|---|---|---|---|---|---|
| | Percent | Percent | Percent | Percent | Percent | Percent | Percent | Percent | Percent | Percent | Percent | Percent |
| Skin | 2.8 | 7.2 | 73.4 | 80.6 | 85.7 | 2.2 | 56.4 | 77.1 | 16.0 | 55.9 | 69.3 | 27.9 |
| Interior | 97.2 | 96.6 | 10.3 | 11.8 | 10.6 | 80.6 | 12.9 | 16.2 | 81.0 | 34.8 | 18.2 | 67.4 |

TABLE VIII

| Section | Uranium | Plutonium | Rare Earths | Sr | Ru | Cs | Te | Nb | Zr | Total β | Total γ |
|---|---|---|---|---|---|---|---|---|---|---|---|
| | Percent | Percent | Percent | Percent | Percent | Percent | Percent | Percent | Percent | Percent | Percent |
| Skull | 2.0 | 2.0 | 64.0 | 42.1 | 1.6 | 6.0 | 72.5 | 9.2 | 38.3 | 50.9 | 18.3 |
| Ingot | 97.6 | 88.4 | 3.1 | 0.2 | 85.2 | 0.1 | 14.5 | [1] 9.3 | 39.7 | 9.3 | 21.7 |

[1] Questionable value.

It will be noted that the cesium values in all of the experiments described above totaled considerably less than 100. In one experiment the crucible was leached and the solution obtained thereby was analyzed. It was found that the crucible-leach solution contained 41.8% of the cesium. In the same experiment a cold finger was suspended over the crucible during melting; a cesium deposit was found thereon after the operation. This showed that a considerable amount of cesium is removed by volatilization and diffusion into the crucible.

Example VIII

Then the effect of various temperatures was examined. For this purpose two parallel experiments were carried out, one using a melting temperature of 1200° C. and the other that of 1310° C., both melting for four hours. In both instances the crucibles were made of aluminum oxide; they had been degassed, as were all the others and as was described previously. The uranium contained 67 g. of plutonium per ton. The analytical results are given in Table IX.

at 1395° C., is satisfactory. Another mixture which proved operative contained 42.74% calcium oxide, 44.19% aluminum oxide, 5.87% magnesium oxide, and 7.19% of lithium oxide. This mixture melts at between 1270° and 1280° C.

In the following an example is given which illustrates the embodiment of the invention using an oxide slag in the liquid state.

Example IX

Irradiated uranium was heated with 4.9% of its weight of the calcium oxide-magnesium oxide-aluminum oxide eutectic containing 46% of calcium oxide, 6.3% of magnesium oxide and 47.7% of aluminum oxide. Heating was carried out in a graphite "bottom-pour" crucible at 1380° C. for one hour and the melted mass was then cooled to a temperature of 1208° C. Altogether the uranium was in a molten condition for about two hours.

The uranium ingot obtained by pouring the melted mass at 1208° C. from the bottom hole of the graphite crucible into a tantalum container was analyzed, and

TABLE IX

| Charge, g. | Section | Uranium | Plutonium | Cs | Sr | Rare Earths | Te | Zr | Nb | Ru | Mo |
|---|---|---|---|---|---|---|---|---|---|---|---|
| | | 1,200°—4 hrs. | | In percent of content in starting material | | | | | | | |
| 116.1 | Skin | 2.3 | 7.8 | 15.2 | 63.9 | 70.2 | 29.0 | 52.6 | 1.7 | 1.6 | |
| | Interior | 97.6 | 88.8 | 0.2 | 0.2 | 0.5 | 53.5 | 46.1 | 99.7 | 106 | 97 |
| | | 1,310° C.—4 hrs. | | | | | | | | | |
| 131.9 | Chips | 1.8 | 7.6 | 0.2 | 0.5 | 15.2 | 9.9 | 1.9 | 0.0 | 0.2 | |
| | Skin | 2.0 | 2.1 | 2.9 | 17.6 | 31.3 | 16.2 | 41.0 | 0.3 | 1.5 | |
| | Interior | 97.6 | 84.9 | 0.03 | 0.01 | 0.7 | 76.8 | 53.7 | 89.8 | 102 | 94 |

This experiment shows that the fission products content of the interior is lower and that thus decontamination is better at 1310° C. than at 1200° C.

It was also found that decontamination of the uranium and its separation from fission products is furthermore improved by providing for a fluid slag instead of the solid slag produced in the experiments of the preceding examples. This can be accomplished satisfactorily by adding to at least one oxide of this invention several oxides, such as lithium oxide, the oxides of alkaline earths, 4-f type rare earths, beryllium, and/or of zirconium in proportions to obtain a slag mixture that melts between 1200° and 1400° C. As a result of the fluidity of the slag the layer of the slag at the reaction interface is constantly renewed by the action of the more rapid diffusion in a liquid as compared with that in a solid. When the uranium has been sufficiently decontaminated the melt is cooled until the slag is solidified but the uranium still is in the liquid state, and the uranium is then poured off the solid slag. Oxide mixtures which have been found operative for the process are the CaO—MgO—Al₂O₃ eutectics (41.5–6.7–51.8% and 46.0–6.3–47.7%, respectively) which melt at about 1345° C. Also the binary eutectic containing 50% calcium oxide and 50% aluminum oxide, which melts so was the skull retained in the graphite crucible. The results are computed in Table X.

TABLE X

| | Skull, percent | Ingot, percent |
|---|---|---|
| Uranium | 16.6 | 82.8 |
| Plutonium | 13.3 | 80.7 |
| Rare Earths | 64.8 | 24.1 |
| Strontium | 88.7 | 0.8 |
| Ruthenium | 11.4 | 89.4 |
| Cesium | 46.8 | 0.9 |
| Tellurium | 7.6 | 2.2 |
| Niobium | 13.2 | 68.7 |
| Zirconium | 71.8 | 10.7 |

It will be understood that this invention is not to be limited to the details given herein but that it may be modified within the scope of the appended claims.

What is claimed is:

1. A process of removing fission products from neutron-bombarded uranium comprising melting said uranium in contact with at least one refractory oxide selected from the group consisting of uranium dioxide, thorium oxide, magnesium oxide, beryllium oxide and aluminum oxide whereby a slag layer forms, and separating the fission products-enriched slag layer from a uranium layer.

2. The process of claim 1 wherein melting is carried out in an inert atmosphere.

3. The process of claim 2 in which the inert atmosphere is helium.

4. The process of claim 1 in which melting is carried out between 1150° and 1400° C.

5. The process of claim 4 wherein the melting temperature is between 1250° and 1400° C. and the oxide is chosen so that it is liquid at said temperature.

6. The process of claim 4 wherein the temperature is between 1150° and 1250° C. and the oxide is solid at said temperature.

7. The process of claim 6 in which the oxide is used in the form of a crucible and the melting is carried out in said crucible.

8. The process of removing fission products from neutron-bombarded uranium comprising adding a refractory oxide selected from the group consisting of uranium dioxide, thorium oxide, magnesium oxide and aluminum oxide to said uranium, said refractory oxide being mixed with at least one other oxide selected from the group consisting of lithium oxide, alkaline earth oxides, rare earth oxides, beryllium oxide and zirconium oxide in quantities to yield a slag that melts between 1250° and 1400° C.; heating the mixture of uranium and oxides until it melts; cooling the molten mass until an oxide slag has solidified but the uranium still is in liquid form; separating the uranium from the solid fission products-containing slag; and cooling the uranium until it is solid.

9. The process of claim 8 in which the oxide mixture is the eutectic of calcium oxide, magnesium oxide and aluminum oxide.

References Cited in the file of this patent

Saul: "Pyrochemical Separation Methods: III. The Removal of Fission Products From Molten, Irradiated Uranium, by Solid Oxides," USAEC Document NAA-SR-1361, September 1, 1955, declassified January 12, 1956, 22 pages.